US009686281B2

(12) United States Patent
Bulusu et al.

(10) Patent No.: US 9,686,281 B2
(45) Date of Patent: *Jun. 20, 2017

(54) TRUSTED APPLICATION MIGRATION ACROSS COMPUTER NODES

(71) Applicant: Intel Corporation, Santa Clara, CA (US)

(72) Inventors: Mallik Bulusu, Olympia, WA (US); Robert Bruce Bahnsen, Tacoma, WA (US); Vincent J. Zimmer, Federal Way, WA (US); Robert S. Gittins, Divide, CO (US); Robert C. Swanson, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/938,223

(22) Filed: Nov. 11, 2015

(65) Prior Publication Data

US 2016/0065573 A1     Mar. 3, 2016

Related U.S. Application Data

(63) Continuation of application No. 13/995,511, filed as application No. PCT/US2011/068031 on Dec. 30, 2011, now Pat. No. 9,210,148.

(51) Int. Cl.
*G06F 21/00* (2013.01)
*H04L 29/06* (2006.01)
(Continued)

(52) U.S. Cl.
CPC .......... *H04L 63/0876* (2013.01); *G06F 21/00* (2013.01); *H04L 63/08* (2013.01); *H04W 12/08* (2013.01); *H04W 12/06* (2013.01)

(58) Field of Classification Search
CPC combination set(s) only.
See application file for complete search history.

(56) References Cited

U.S. PATENT DOCUMENTS 7,774,824 B2 * 8/2010 Ross ................... G06Q 20/382
                                                                  705/73
2005/0278775 A1  12/2005 Ross
(Continued)

FOREIGN PATENT DOCUMENTS

| CN | 1950808   | 4/2007 |
| EP | 2160029   | 3/2010 |
| TW | 200838308 | 9/2008 |

OTHER PUBLICATIONS

Taiwan IPO Search Report, "Search Report and Written Opinion," from Taiwanese Office Action Dated Aug. 12, 2014, in Taiwan Invention Patent Application No. 101150123.
(Continued)

*Primary Examiner* — Beemnet Dada
(74) *Attorney, Agent, or Firm* — Trop, Pruner & Hu, P.C.

(57) ABSTRACT

An embodiment includes a secure and stable method for sending information across a compute continuum. For example, the method may include executing an application (e.g., video player) on a first node (e.g., tablet) with a desire to perform "context migration" to a second node (e.g., desktop). This may allow a user to watch a movie on the tablet, stop watching the movie, and then resume watching the movie from the desktop. To do so in a secure and stable manner, the first node may request security and performance credentials from the second node. If both credential sets satisfy thresholds, the first node may transfer content (e.g., encrypted copy of a movie) and state information (e.g., placeholder indicating where the movie was when context transfer began). The second node may then allow the user to
(Continued)

resume his or her movie watching from the desktop. Other embodiments are described herein.

20 Claims, 5 Drawing Sheets

(51) Int. Cl.
  *H04W 12/08* (2009.01)
  *H04W 12/06* (2009.01)

(56) References Cited

U.S. PATENT DOCUMENTS

| | | |
|---|---|---|
| 2006/0294379 A1 | 12/2006 | Ishidoshiro |
| 2007/0266410 A1 | 11/2007 | Balfanz |
| 2008/0016342 A1 | 1/2008 | Shimada et al. |
| 2009/0113481 A1* | 4/2009 | Friedman ........... H04N 5/44543 725/46 |
| 2010/0107205 A1 | 4/2010 | Foti |
| 2011/0091187 A1 | 4/2011 | Duffin |

OTHER PUBLICATIONS

International Searching Authority, "Notification of Transmittal of the International Search Report and the Written Opinion of the International Searching Authority," mailed Sep. 25, 2012, in International application No. PCT/US2011/068031.

European Patent Office, "Communication," mailed Jul. 29, 2015 in European application No. 11878781.1 6 pages.

State Intellectual Property Office of the People's Republic of China, Office Action mailed Mar. 18, 2015 in Chinese Patent Application No. 201180076131.2.

Taiwan Intellectual Property Office, Office Action mailed Oct. 20, 2016 in Taiwan Patent Application No. 104133217.

\* cited by examiner

TRUSTED APPLICATION MIGRATION ACROSS COMPUTER NODES

This application is a continuation of U.S. patent application Ser. No. 13/995,511, filed Jun. 19, 2013, which is a §371 National Stage Entry of International Application No. PCT/US2011/68031, filed Dec. 30, 2011. The content of each of the above applications is hereby incorporated by reference.

BACKGROUND

A "Compute Continuum" provides a consistent client-aware connected environment for a user across varying computing devices. The compute continuum places the user at the center of his or her own "cloud" among the varying computing devices.

For example, a user may download a copy of a movie to his or her tablet computer to view while the user travels in an airplane on a business trip. At the end of the airplane's flight the user may stop viewing the movie, on his or tablet, at location X in the movie. The user may then arrive home and wish to transfer the movie to the user's smart television, which includes a desktop computer using a television as its display monitor. Further, the user may wish to continue viewing the movie starting at location X. In other words, the user may wish to seamlessly migrate his compute context across the compute continuum. Put another way, the user may wish to transfer his compute context, which may include content (e.g., movie, electronic book, executable code, and the like) and state information pertaining to user's computing experience on the node (e.g., location X for the movie), from one compute node (e.g., computer node) to another compute node.

With a properly implemented compute continuum, a user may be able to accomplish the above tasks and manage his environment across varying computing devices. However, simply transferring the copy of the movie and related information (e.g., state information pertaining to location X) from the tablet to the desktop computer may expose either or both of the tablet and desktop to malware and general security and stability risks. For example, a virus may transfer from one node to another. Also, the desktop computer may not have the proper computing capacity and may consequently be unable to stably play the movie (e.g., possibly a three dimensional or interactive move with high memory and processing requirements) for the user.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

Figure 1:
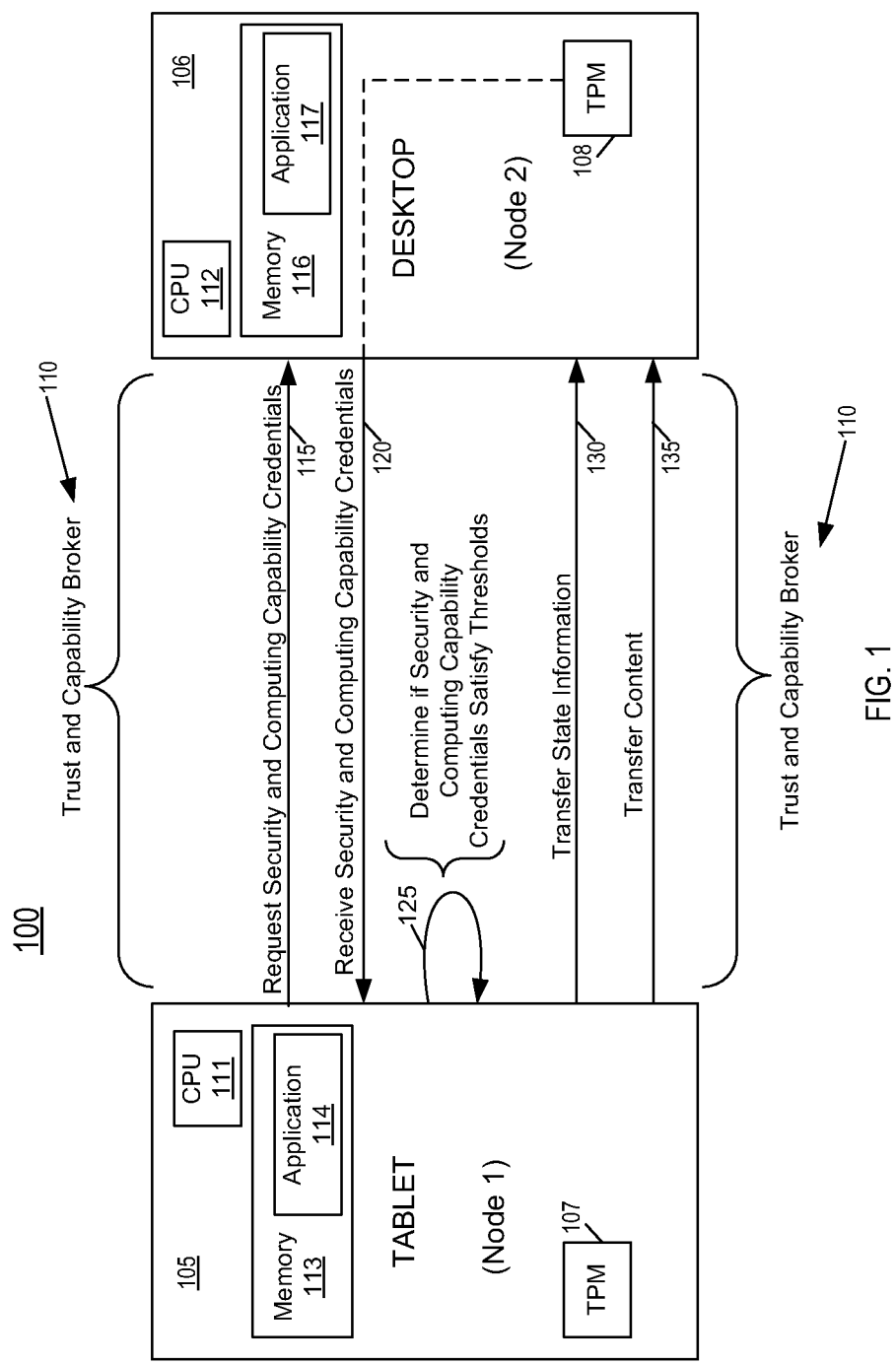
FIG. 1 includes an overview of a method for trusted application migration across computer nodes.

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment.

An embodiment includes a method for securely migrating a user's compute context across a compute continuum. For example, the method may include securely sending (e.g., transferring) a user's computing context from one node to another node. More specifically, the method may include executing a first application (e.g., video player) on a first node (e.g., tablet computer) with a desire to perform "context migration" to a second node (e.g., desktop computer). This may allow a user to watch a movie on a tablet computer (first node), stop watching the movie, and then resume watching the movie from a desktop computer (second node). To do so in a secure and stable manner, the first node may request security credentials (e.g., evidence concerning whether the second node was securely booted) and performance credentials (e.g., evidence concerning whether the second node has sufficient memory to stably play the movie content being transferred from the first node) from the second node. If the security and computer performance credentials for the second node both satisfy corresponding thresholds, the first node may transfer content (e.g., an encrypted copy of a movie) and/or state information (e.g., a placeholder indicating where the movie was when the context transfer began) to the second node. The second node, after receiving the content and state information from the first node, may allow the user to resume his or her movie watching, using the desktop computer. The movie watching may "pick up where the user left off" so the user can begin watching the movie from the location her or she had previously stopped watching the movie. The above process may allow for secure and stable context migration across a compute continuum.

Figure 2:
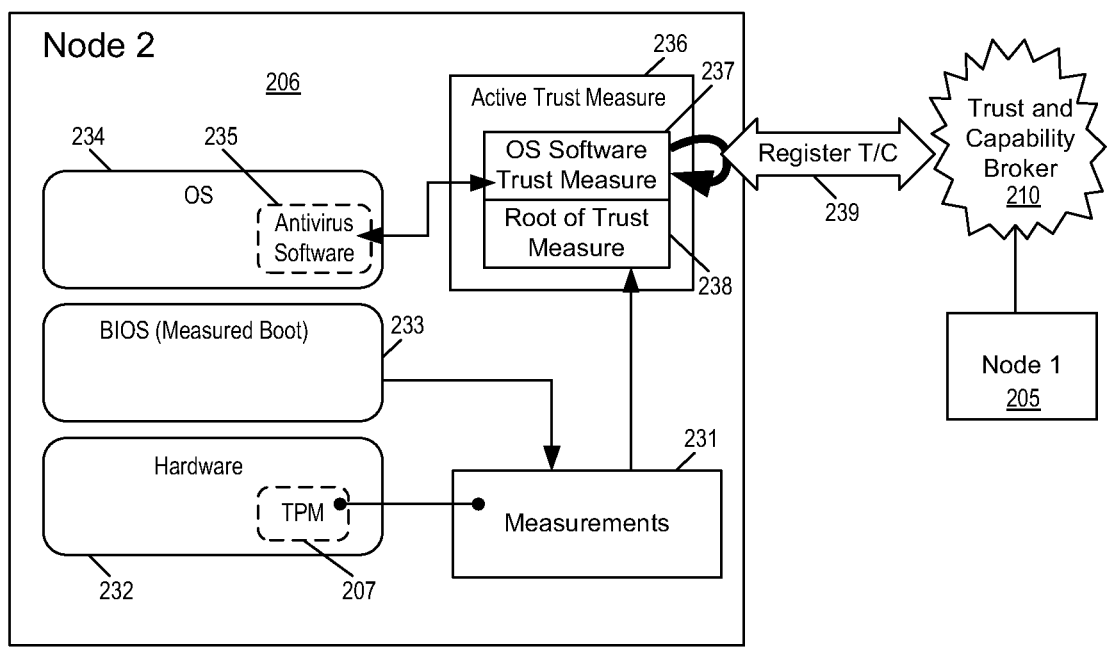
FIG. 2 includes a schematic block diagram of a node in an embodiment of the invention.
Figure 3:
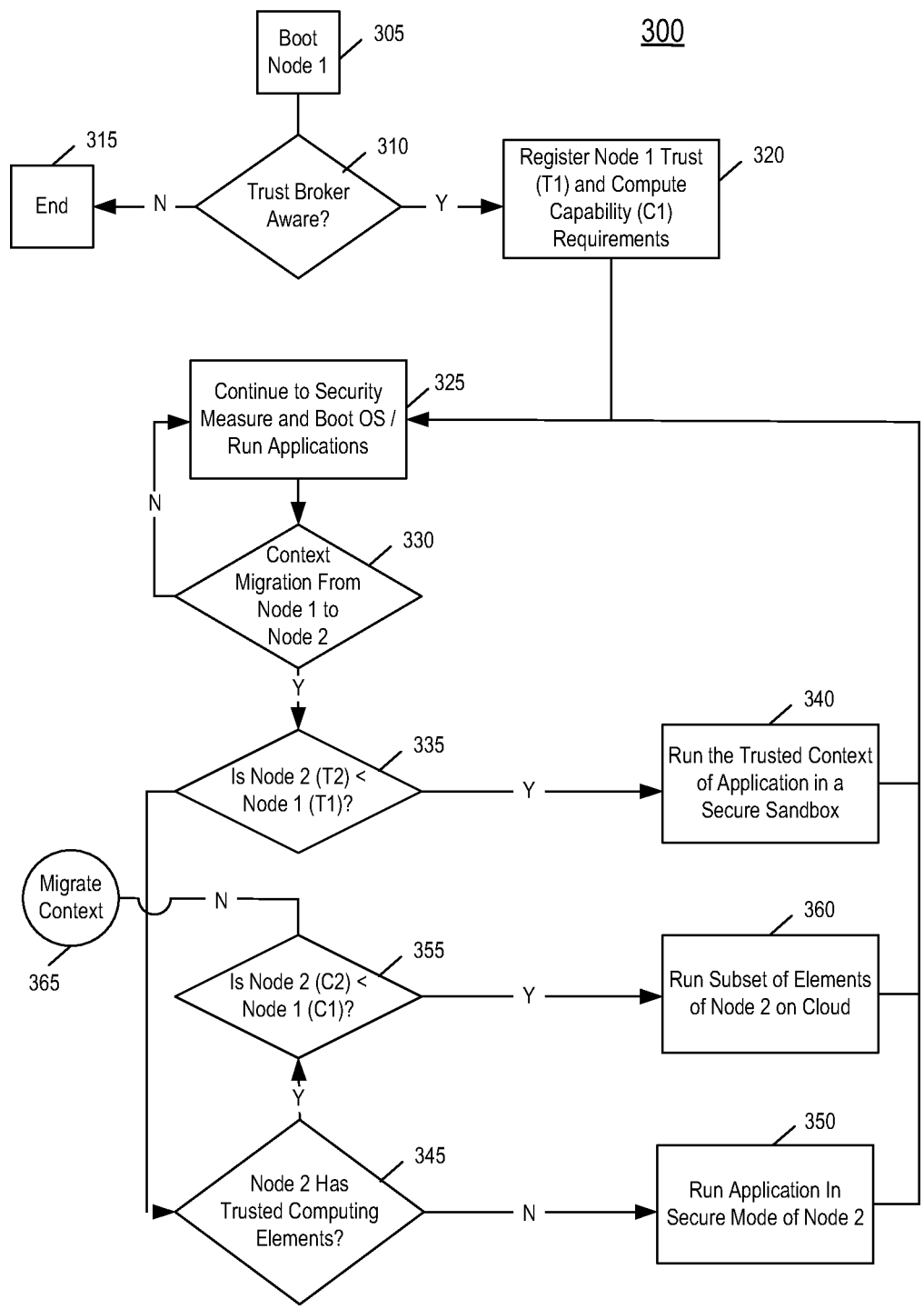
FIG. 3 includes a schematic flow chart for secure compute context motion from the perspective of one of the transferring nodes in an embodiment of the invention.
Figure 4:
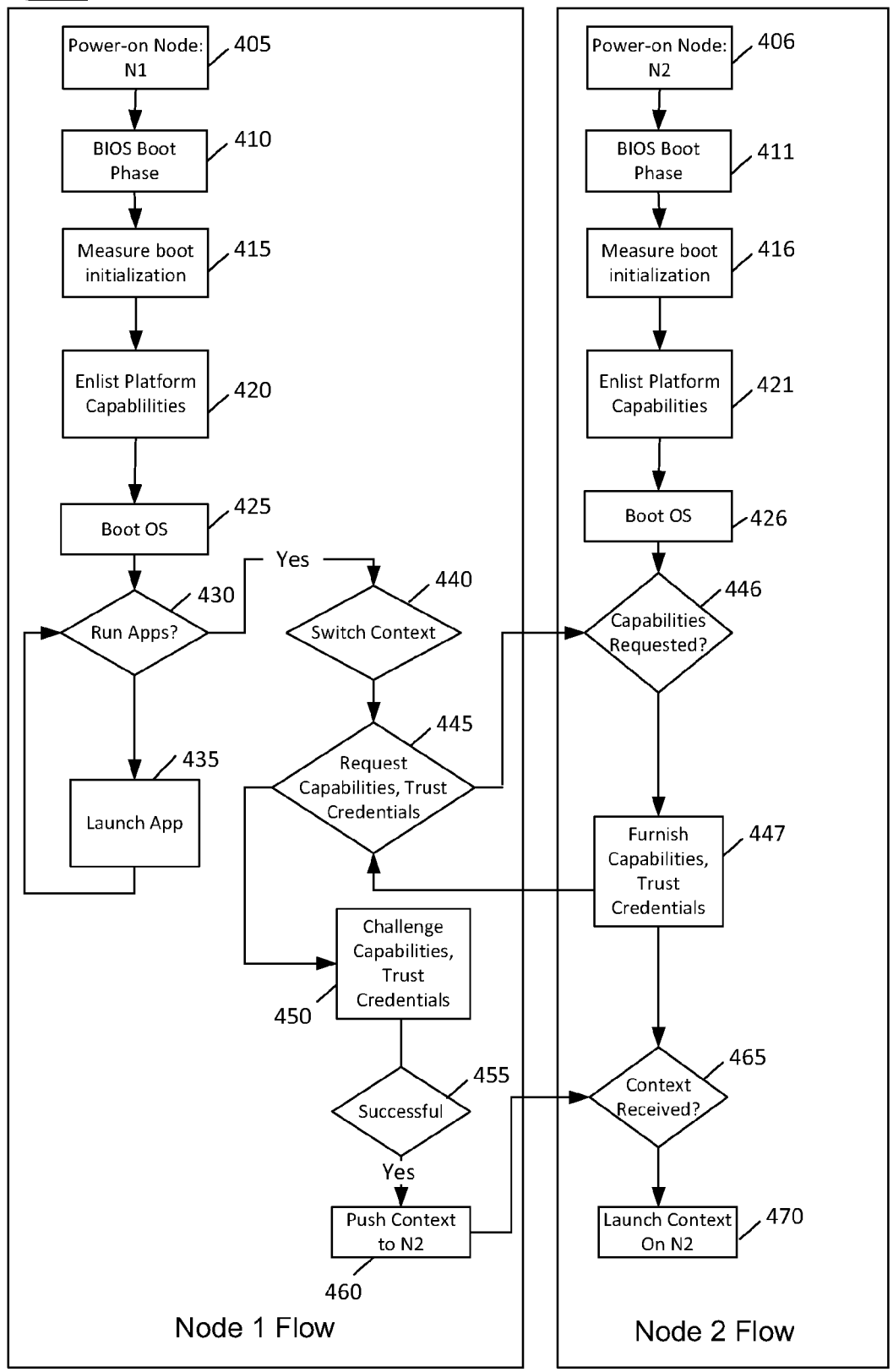
FIG. 4 includes a schematic flow chart for secure compute context motion from the perspective of the transferring nodes in an embodiment of the invention.

FIG. 1 includes an overview of a method for trusted application migration across computer nodes. FIGS. 2, 3, and 4 provide more detailed examinations of embodiments for trusted application migration across computer nodes.

Regarding FIG. 1, Nodes 105 and 106 may respectively each include at least one processor 111, 112. Node 105 may couple to node 106 via a network, such as the internet (cloud), local area network (LAN), wide area network (WAN), and the like. Node 105 may include application 114, stored in memory 113 and executing on processor 111. In one embodiment, a corresponding instance (e.g., copy or issue) of application exists as application 117 in node 106.

In actions 115 and 120 node 105, using "trust and capability broker" logic module 110, may request and receive security credentials from node 106. Security credentials may relate to the security status (e.g., root of trust) for node 106 such as, for example, whether node 106 was securely booted. More specifically, the security credentials may be based on a measurement of a binary input/output system (BIOS) for node 106, with the measurement having been made during a boot of node 106 and before an operation system (OS) of node 106 is booted. The measurement may have been securely stored in trusted platform module (TPM) 108 of node 106. The measurement, upon receipt at node 105, may be stored in TPM 107.

In actions 115 and 120 trust and capability broker 110 of node 105 may also request and receive computing capability credentials from node 106. The computing capability credentials may concern what level of computing node 106 is capable of. Such credentials may pertain to memory, processing power, and the like.

In action 125 trust and capability broker 110 of node 105 determines whether the security credentials and computing capabilities from node 106 satisfy respective thresholds. For example, the security threshold may concern proof of a secure root of trust for node 106. The threshold for computing capability may concern whether node 106 includes a minimum amount of memory and/or processing power.

Action 130 includes transferring state information, which relates to the execution state of application 114, to node 106 based on determining the transferred security credentials satisfy a security threshold. For example, if the security threshold is satisfied the state information may be transferred to node 106. In an embodiment, the transfer of state information may be further based on node 105 determining the computing capability credentials satisfy a computing capability threshold.

Node 105 may have been previously processing content with application 114. For example, application 114 may be a video player that plays content, such as a movie. Node 105 may have played and displayed a first portion of the movie content, such as scenes associated with a first chapter of the movie. Based on the state information, node 105 may know the end of the first chapter was where the user stopped viewing the movie and attempted to migrate his computing context from node 105 to node 106. Consequently, node 105 may transfer a second portion of the content, such as the remaining chapters of the movie, to node 106.

Node 106 may then use application 117, running on processor 112, to process the content. Based on the state information, node 106 may start playing the aforementioned movie starting at the beginning o of the second chapter.

Thus, the method of FIG. 1 discloses an embodiment that allows a user to seamlessly disengage the compute context from a specific compute node. Then the context may be migrated to another compute node that is more appropriate for the user's present location (e.g., being at home instead of on a commuter train). The migration may use trusted computing blocks (e.g., trusted boot measurement stored in a TPM) to ensure the context migration is an authenticated context migration. A "trust broker" may be used to ameliorate concerns about trustworthiness of target machines and a "capability broker" may be used to ameliorate concerns about computing capacity of target machines. This authenticated context migration may provide application (e.g., a software application) context mobility across the compute continuum in both a trustworthy fashion and across a broad class of vendor platforms.

FIG. 2 includes a schematic block diagram of a node in an embodiment of the invention. Node 206 includes capabilities for active trust measurement and includes or couples to a broker (e.g., included in node 205, node 206, and/or the cloud) for inter-node exchange (i.e., between nodes 205, 206) of trust credentials and/or computation capabilities.

Regarding trust credentials, such credentials may concern at least one or more factors. For example, a first factor concerns whether node 206 has a firmly established root of trust as captured in, for example, measurement table 231 (which may be secured within TPM 207). Table 231 may be formatted in a manner similar to the Advanced Configuration and Power Interface (ACPI) specification, which provides an open standard for device configuration and power management by an OS. Thus, table 231 may provide a platform-independent interface for hardware discovery, configuration, power management and monitoring.

A second factor may concern verifying the software stack of node 206 (e.g., OS) is reliable and trustworthy. The root of trust can be established by pre-boot firmware. For example, the trustworthiness of software can be established by antivirus agent 235 that is implemented as a background service on node 206.

Thus, the first and second factors that make up the credentials in one embodiment have a static component as well as a dynamic component. The static component may relate to a measured boot of BIOS 233. The dynamic component may relate to post boot measurements conducted via service 235, which operates after boot of OS 234. Both static and dynamic measurements can be stored in querycable table 231.

Regarding TPM 207, the TPM includes a secure cryptoprocessor that can store cryptographic keys that protect information. The TPM may comply with the Trusted Computing Group TPM specification, such as TPM specification 1.2 Revision 116. TPM 207 may offer facilities for the secure generation of cryptographic keys, and limitation of their use, in addition to a hardware pseudo-random number generator. It also may include capabilities such as remote attestation and sealed storage. TPM 207 may assure the integrity of node 206. This may entail attesting the power-on boot process began from a trusted condition and extends this trust until BIOS 233 and OS 234 have fully booted and applications are running. Together with BIOS 233, TPM 207 may form a Root of Trust measurement 238 based on OS measurement 237 to collectively form active trust measurements 236. TPM 207 contains several Platform Configuration Registers (PCRs) that allow secure storage and reporting of security relevant metrics. These metrics can be used to detect changes to previous configurations and derive decisions how to proceed. Therefore, BIOS 233 and OS 234 may utilize TPM 207 to assure platform integrity for platform 206.

In one embodiment, if a user wants to move his or her compute context from, for example, a handheld (e.g., node 205) to a personal computer (PC) (e.g., node 206), he or she may initiate a query of the active trust measurement 236 of node 206 from node 205. These measurements may constitute security credentials that node 205 can evaluate. As indicated in action 239, node 206 may register its security/trust measurements (T) and/or its computing capability information (C) with Trust and Capability broker 210, which may be implemented as control logic. Once trust metrics 236 are received by node 205, those metrics may be evaluated by node 205 (e.g., using broker 110 which may be included in node 205, in the cloud, and the like) before making a decision as to whether to approve or disapprove, fully or partially, the compute context motion.

FIG. 3 includes an embodiment for secure compute context motion in an embodiment of the invention. FIG. 3 is written from the perspective of node 205 (referred to as "node 1" or N1 in FIG. 3), the node that will transfer compute context to node 206 (referred to as "node 2" or N2 in FIG. 3). Node 205 is the "stateful node" as it includes (locally) the state of an application, wherein the state is to be transferred to make the migration seamless to the user. In block 305 node 1 boots. It may do so in a secure manner using trusted computing blocks such as TPMs and the like discussed above.

In block 310 node 1 attempts to discover whether any trust and capability broker resides on or couples to node 1. Node 1 can use, for example, TCG or Secure Enclave style "Quotes" to tell broker 210 its trust state and/or compute needs (i.e., items T and C of action 239 in FIG. 2). Broker 210, which may be stored in node 205, 206, and/or cloud) will ensure that any migration of application state to node 206 does not diminish either the trust or computational needs of application 114 (FIG. 1).

In block 315, if there is no broker then any context migration may be performed without security and stability measures described herein. However, if such a broker is located then in block 320 node 1 may register its trust and compute capability credentials with the broker. From the perspective of node 1, these may actually be requirements for what node 205 desires, rather than credentials that node 1 may have. These values may serve as thresholds which T and C values from node 2 will be compared (addressed in steps further below).

In block 325 node 1 continues its booting and measurement taking of BIOS, OS, and the like. Node 1 may proceed to executing applications. In block 330 node 1 determines if context migration from node 1 to node 2 is desired. If not, process 300 may return to block 325. However, if migration is desired then in block 335 the broker determines if trust levels/credentials for node 2 satisfy the registered requirements (see block 320) for node 1. If node 2 does not meet the corresponding threshold then in block 340 the corresponding application on node 2 may be run in a secure mode, such as with a secure sandbox format. For example, a sandbox may include a security mechanism for separating running programs. It may be used to operate content, such as code, that is transferred from node 1 to node 2. The sandbox environment may provide a tightly-controlled set of resources for programs to run in, such as scratch space on disk and memory. Network access, the ability to inspect the host system or read from input devices of node 2, may be disallowed or heavily restricted. A sandbox may be implemented using virtualization technology. The application may even be executed on the cloud while in a sandboxed environment.

Returning to block 335, if node 2 trust credentials do suffice for the registered requirements/threshold of block 320, then in block 345 the broker may determine if node 2 has trusted computing elements (e.g., TPM). If not, process 300 advances to block 350 where node 2 may operate/process the application and/or transferred content in a sandbox environment, secure mode, and the like.

However, if the answer to block 345 is yes, the process may proceed to block 355 where the broker determines if node 2 computing capabilities satisfy the corresponding threshold of block 320. If node 2 does not satisfy the threshold, in block 360 the missing capacity may be filled by cloud services (i.e., the capacity of node 2 couples with services provided via the cloud to operate an application and provide for context migration). If node 2 does satisfy the threshold, the computing context (e.g., state information and content, such as data, code, and the like) may be transferred to node 2 in block 365.

Thus, as shown in FIG. 3, when the broker determines node 2 security credentials do not satisfy the corresponding threshold, node 2 can be made to execute another instance of the first application in a restricted secure mode; wherein the restricted secure mode includes restricted functionality for node 2 and restricted access to memory included in/coupled to node 2. Embodiments may provide after the broker determines the node 2 security credentials do not satisfy a corresponding security threshold; that node 2 execute another instance of the application (running on node 1) in a sandbox environment. Embodiments regarding security credential mismatches (e.g., block 340) may result in the second node processing transferred content in a sandbox and the like.

The ability to force node 2 to operate in a restricted mode may be performed using the TPM capabilities of node 2. For example, restricted access settings may be encrypted and transferred from the TPM of node 1 to the TPM of node 2. Each TPM may have corresponding keys to allow for the secure encryption/decryption of such settings. In one embodiment node 1 can directly rely on node 2 to first create a sandbox environment. In another embodiment, node 1 can transfer a sandbox environment to node 2. Once this sandbox environment is installed on node 2, the application context may then be migrated to node 2 to work under the sandbox environment. In another embodiment, the sandbox environment can be located in-situ with the application that is being migrated. In such a case, the application may be responsible for invoking (or not invoking) this sandbox environment. For instance, if the node 1 security is greater than what is required by the application, then the application may chose to disable the in-situ sandbox environment. However, when migrating the context to node 2, which may include an inferior trust level, then the application may choose to activate the in-situ sandbox.

FIG. 4 includes a schematic flow chart for secure compute context motion from the perspective of the transferring nodes in an embodiment of the invention. FIG. 4 includes flow charts for process 400, which pertains to both nodes 1 and 2. In block 405 node n1 powers on. In blocks 410 and 415, BIOS is booted and measured for establishing a secure root of trust. In block 420, various platform capabilities such as System Management BIOS (SMBIOS), ACPI, and the like are enlisted. SMBIOS concerns a specification that defines data structures (and access methods) in a BIOS, which allows a user or application to store and retrieve information specifically about the computer in question. These capabilities help build measurements for the node. In block 425, the OS is booted.

Blocks 406, 411, 416, 421, and 426 perform equivalent operations on node 2 as blocks 405, 410, 415, 420, and 425 for node 1.

In blocks 430, 435 node 1 executes an application, such as a video player. In block 440 it is determined whether a context migration is desired. If so, in block 445 node 1 requests computing capability and trust credentials from node 2. In blocks 446, 447 the request is received and responded to by node 2. In block 445 the computing capability and trust credentials are evaluated (e.g., compared to a threshold) by the broker module/control logic. If the computing capability and trust credentials are satisfactory to the broker, then in block 460 node 1 pushes the compute context (e.g., state information and/or content such as data, code, and the like) to node 2. In block 465 the context is received by node 2 and in block 470 the context is launched.

Thus, various embodiments described herein include capturing trust measures that can be shared between compute nodes in order to facilitate compute context motion in a trusted manner that is technology-specific and vendor-neutral.

Embodiments may be distributed in many ways. For example, determining whether node 2 (the node to which the compute context will be transferred to) includes acceptable security and/or compute capability credentials may be performed in various manners. Node 1 may receive the security and compute capability credentials in several ways. An actual instance of the credentials transferred from node 2 may be sent to node 1. However, node 1 may instead receive a value or values derived from the credentials transferred from node 2. For example, node 2 may transfer credentials to a broker located in the cloud and the broker may transfer a message to node 1 that is indicative of the security and/or compute capabilities of node 2. In embodiments where node 1 must query security and/or compute capabilities of node 2, the querying may be performed by the broker, which can be located on node 1, node 2, and/or the cloud.

Embodiments allow building blocks related to trust and virtualization to make computing more personable. The trusted computing paradigm can be applied to future compute models such as mobile compute context.

At times the above description has used playback of movies as a means for illustrating examples of contexts and environments for using embodiments of the invention. However, embodiments are not limited to movie watching. For example, a user may wish to transfer his compute context related to e-book reading. An electronic book may have digital rights restrictions that allow the user to only maintain a single copy of the e-book. In such a case a user may be reading the book at page 100. He may then want to migrate from his tablet to his Smartphone. Embodiments described herein may vet the security and/or compute capability of the phone and, upon passing corresponding thresholds, transfer content and state information so the user can resume reading the e-book at page 100 on his or her phone. Also, the phone having proper security credentials (e.g., secure boot and TPM) may ensure the encrypted copy of the book stays encrypted and secure.

Other examples may relate to transferring code. A user may be operating Java Script program on her tablet computer. The program may concern a pinball video game and the user may have a score of 200,000 when she needs to discontinue playing the game on her tablet. She may perform compute context migration to her Smartphone. Embodiments described herein may vet the security and/or compute capability of the phone and, upon passing corresponding thresholds, transfer content (e.g., Java Script program) and state information (e.g., score equals 200,000 with one pinball left to use) so the user can resume playing the video game with a score of 200,000 on her phone. If the Smartphone and tablet computer have a security mismatch the Java Script may operate in a sandbox environment/secure operating mode on the phone. The mismatch may include the tablet being less secure than the phone, the tablet being more secure than the phone, the tablet having greater available computing capabilities than the phone, the tablet having lesser available computing capabilities than the phone, and the like.

As another example, a user may wish to transfer his compute context related to email. In such a case a user may begin composing an email. He may then want to migrate from his tablet to his Smartphone. Embodiments described herein may vet the security and/or compute capability of the phone and, upon passing corresponding thresholds, transfer content (e.g., the body of the email) and state information so the user can resume composing the email on his or her phone.

In an embodiment, a first compute node couples to a second compute node via a network, such as the internet, WAN, LAN, cloud, and the like. The first node executes an application locally on the first compute node. The application may include, for example, a video player, e-mail program, e-book reader, word processor, script (e.g., Java Script) and the like. The first node may send state information, which relates to an execution state of the application (e.g., how much of an email was composed, what line of a program was last executed) and which is included locally on the first compute node (e.g., the program was not completely offloaded to the cloud), from the first compute node to the second compute node when a security credential satisfies a security threshold. The security credential may be based on a security status (e.g., whether node 2 was securely booted) for the second compute node. A broker module may determine when a security credential satisfies a security threshold. The broker may be included in the first node, the cloud, the second node, a mixture of any of these elements (e.g., distributed computing network extending over several nodes).

An embodiment may distribute processing in various ways. In one embodiment, the first compute node may send content (e.g., a movie or video, text, a script or program) from the first compute node to the cloud, second node, and the like. The second compute node may process a first portion of the content locally on the second compute node based on the state information; and the network may process a second portion of the content (e.g., content that requires compute capabilities not available on the second node) when a computing capability credential does not satisfy a computing capability threshold (possibly as judged by a broker module).

An embodiment may include the first compute node sending content from the first compute node and the network processing the content when the security credential does not satisfy the security threshold (e.g., content whose security must be more vigorously protected and is thus inappropriate for a node with limited security protection).

In an embodiment, a second compute node may execute another instance of the application (e.g., a duplicate copy of an application on the first node such as another copy of a media player) locally on the second compute node based on the state information.

In an embodiment, the second compute node may execute another instance of the application in a restricted secure mode when the broker module determines the security credential does not satisfy the security threshold.

Figure 5:
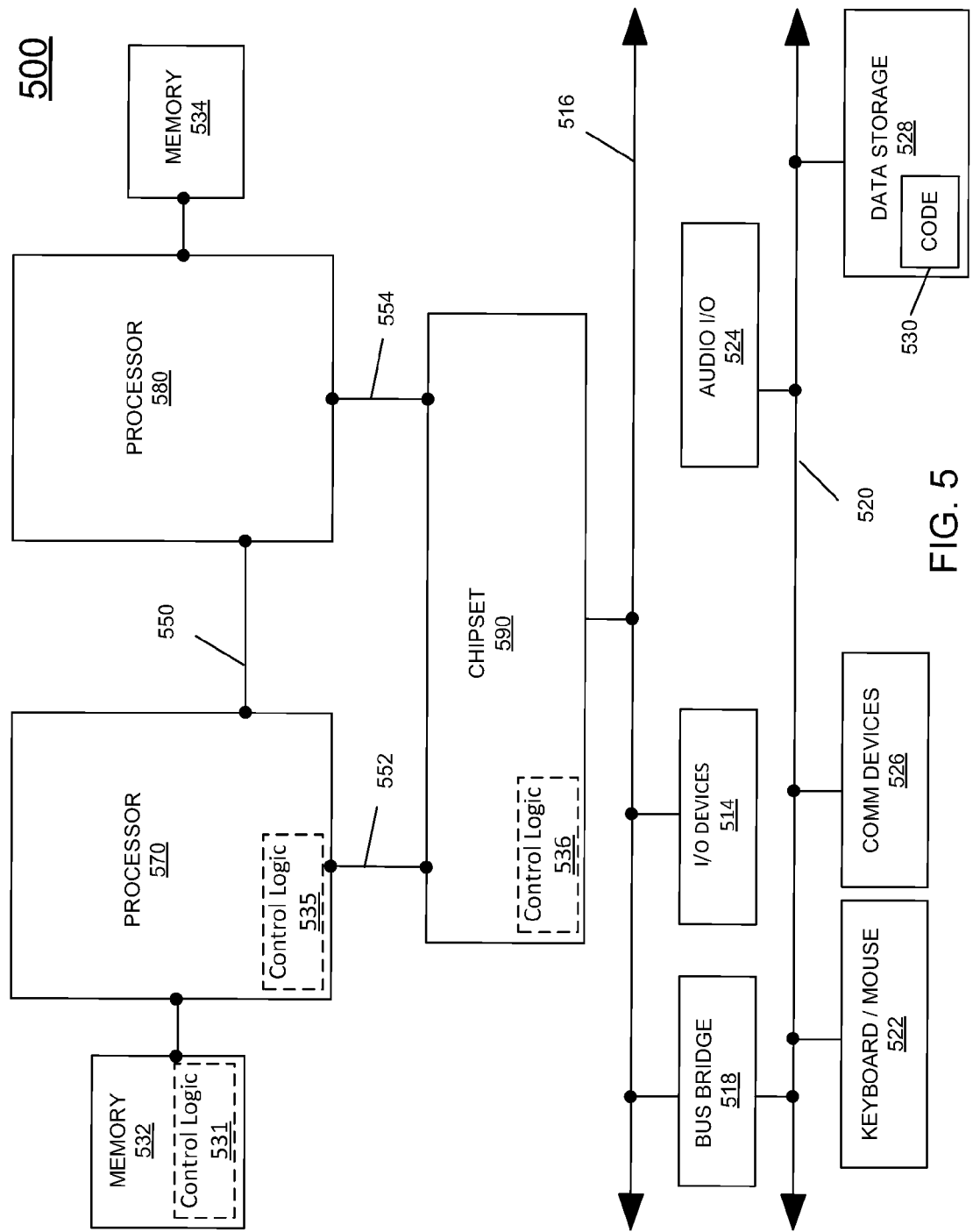
FIG. 5 includes a system for implementing a compute node, broker, or other components of embodiments described herein.

Embodiments may be implemented in many different system types. Referring now to FIG. 5, shown is a block diagram of a system (e.g., node 1, node 2, and the like) in accordance with an embodiment of the present invention. Multiprocessor system 500 is a point-to-point interconnect system, and includes a first processor 570 and a second processor 580 coupled via a point-to-point interconnect 550. Each of processors 570 and 580 may be multicore processors. The term "processor" may refer to any device or portion of a device that processes electronic data from registers and/or memory to transform that electronic data into other electronic data that may be stored in registers and/or memory. First processor 570 may include a memory controller hub (MCH) and point-to-point (P-P) interfaces. Similarly, second processor 580 may include a MCH and P-P interfaces. The MCHs may couple the processors to respective memories, namely memory 532 and memory 534, which may be portions of main memory (e.g., a dynamic random access memory (DRAM)) locally attached to the respective processors. First processor 570 and second processor 580 may be coupled to a chipset 590 via P-P interconnects, respectively. Chipset 590 may include P-P interfaces. Furthermore, chipset 590 may be coupled to a first bus 516 via an interface. Various input/output (I/O) devices 514 may be coupled to first bus 516, along with a bus bridge 518, which couples first bus 516 to a second bus 520. Various devices may be coupled to second bus 520 including, for example, a keyboard/mouse 522, communication devices 526, and data storage unit 528 such as a disk drive or other mass storage device, which may include code 530, in one embodiment. Code may be included in one or more memories including memory 528, 532, 534, memory coupled to system 500 via a network, and the like. Further, an audio I/O 524 may be coupled to second bus 520.

Embodiments may be implemented in code and may be stored on at least one storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered.

In one embodiment, use of the term control logic includes hardware, such as transistors, registers, or other hardware, such as programmable logic devices (535). However, in another embodiment, logic also includes software or code (531). Such logic may be integrated with hardware, such as firmware or micro-code (536). A processor or controller may include control logic intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory storage medium having instructions stored thereon for causing a system to perform a method comprising a first compute node:
   coupling to a second compute node via a network;
   executing an application locally on the first compute node; and
   sending state information, which relates to an execution state of the application and which is included locally on the first compute node, from the first compute node to the second compute node when a security credential satisfies a security threshold;
   wherein the security credential is based on a security status for the second compute node;
   wherein a broker module, which couples to the first compute node, determines whether the security credential satisfies the security threshold;
   wherein (i) the second compute node executes another instance of the application in a restricted secure mode when the broker module determines the security credential does not satisfy the security threshold; and (ii) the restricted secure mode includes restricted access to memory included in the second compute node.

2. The at least one medium of claim 1, the method comprising the first compute node sending the state information to the second compute node when a computing capability credential satisfies a computing capability threshold;
   wherein the computing capability credential is based on a computing capability status for the second compute node.

3. The at least one medium of claim 1, the method comprising the first compute node sending content, different from the state information, from the first compute node; wherein:
   the second compute node processes a first portion of the content locally on the second compute node based on the state information;
   the network, included in a cloud-based network, processes a second portion of the content when a computing capability credential does not satisfy a computing capability threshold; and
   the computing capability credential is based on a computing capability status for the second compute node.

4. The at least one medium of claim 1, the method comprising the first compute node sending content, different from the state information, from the first compute node;
   wherein the network, included in a cloud-based network, processes the content when the security credential does not satisfy the security threshold.

5. The at least one medium of claim 1, the method comprising the first compute node:
   playing video content;
   discontinuing playing the video content at a first point in time; and correlating the state information with the video content and the first point in time.

6. The at least one medium of claim 1, the method comprising the first compute node:
processing a first portion of content with the application; and
sending a second portion of the content to the second compute node when the security credential satisfies the security threshold.

7. At least one non-transitory storage medium having instructions stored thereon for causing a system to perform a method comprising a first compute node:
coupling to a second compute node via a network;
executing an application locally on the first compute node; and
processing a first portion of content with the application;
when a security credential satisfies a security threshold and a computing capability credential satisfies a computing capability threshold, sending from the first compute node to the second compute node state information, which relates to an execution state of the application and which is included locally on the first compute node;
when the security credential satisfies the security threshold, sending from the first compute node to the second compute node a second portion of the content;
wherein the security credential is based on a security status for the second compute node and the computing capability credential is based on a computing capability status for the second compute node;
wherein a broker module, which couples to the first compute node, determines whether the security credential satisfies the security threshold and whether the computing capability credential satisfies the computing capability threshold.

8. The at least one medium of claim 7, wherein:
the second compute node processes the second portion of the content locally on the second compute node based on the state information; and
the network, included in a cloud-based network, processes a third portion of the content when the computing capability credential does not satisfy the computing capability threshold.

9. The at least one medium of claim 7, wherein the network, included in a cloud-based network, processes a third portion of the content in response to the broker module determining the security credential does not satisfy the security threshold.

10. The at least one medium of claim 7, the method comprising the first compute node:
playing video content that includes the first portion of the content;
discontinuing playing the video content at a first point in time; and
correlating the state information with the video content and the first point in time.

11. The at least one medium of claim 7, wherein the security credential is based on at least one of: (i) a measurement of a BIOS of the second compute node measured during a boot of the second compute node and before an operation system (OS) of the second compute node is booted, and (ii) a measurement of the OS of the second compute node.

12. The at least one medium of claim 7, wherein the second compute node executes another instance of the application, locally on the second compute node, based on the state information.

13. At least one non-transitory storage medium having instructions stored thereon for causing a system to perform a method comprising a first compute node:
coupling to a second compute node via a network;
executing an application locally on the first compute node; and
sending state information, which relates to an execution state of the application and which is included locally on the first compute node, from the first compute node to the second compute node when a security credential satisfies a security threshold;
sending a compute context of the first compute node to the second compute node based on the first compute node sending the state information to the second compute node;
wherein:
a broker module, which couples to the first compute node, determines whether the security credential satisfies the security threshold;
the network comprises a cloud-based network, and the broker module is one of (i) included within the first compute node, (ii) included in the cloud-based network, and (iii) included in both the first compute node and the cloud-based network;
the security credential is based on (iii) whether the second compute node was securely booted, and (iv) a value securely included in a cryptoprocessor of the second compute node.

14. The at least one medium of claim 13, the method comprising the first compute node sending the state information to the second compute node when a computing capability credential satisfies a computing capability threshold;
wherein the computing capability credential is based on a computing capability status for the second compute node.

15. The at least one medium of claim 13, the method comprising the first compute node sending content, different from the state information, from the first compute node;
wherein:
the second compute node processes a first portion of the content locally on the second compute node based on the state information;
the network processes a second portion of the content when a computing capability credential does not satisfy a computing capability threshold; and
the computing capability credential is based on a computing capability status for the second compute node.

16. The at least one medium of claim 13, the method comprising the first compute node sending content, different from the state information, from the first compute node;
wherein the network processes the content when the security credential does not satisfy the security threshold.

17. The at least one medium of claim 13, the method comprising the first compute node:
playing video content;
discontinuing playing the video content at a first point in time; and
correlating the state information with the video content and the first point in time.

18. The at least one medium of claim 7, wherein:
the second compute node processes the second portion of the content locally on the second compute node based on the state information;
the network, included in a cloud-based network, processes a third portion of the content in response to the broker module determining a computing capability credential does not satisfy a computing capability threshold; and
the computing capability credential is based on a computing capability status for the second compute node.

19. The at least one medium of claim 7, the method comprising in response to the broker module determining the security credential satisfies the security threshold, sending from the first compute node to the second compute node: (a) the state information and (b) the second portion of the content.

20. At least one non-transitory storage medium having instructions stored thereon for causing a system to perform a method comprising a first compute node:
coupling to a second compute node via a network;
executing an application locally on the first compute node; and
processing a first portion of content with the application;
when a security credential satisfies a security threshold, sending from the first compute node to the second compute node: (a) state information, which relates to an execution state of the application and which is included locally on the first compute node; and (b) a second portion of the content;
wherein the security credential is based on a security status for the second compute node and a computing capability credential is based on a computing capability status for the second compute node;
wherein a broker module, which couples to the first compute node, determines whether the security credential satisfies the security threshold;
wherein the second compute node processes the second portion of the content locally on the second compute node based on the state information;
wherein the network, included in a cloud-based network, processes a third portion of the content when a computing capability credential does not satisfy a computing capability threshold.

* * * * *